April 15, 1969     V. B. D. SKERMAN     3,438,690
MICROSCOPE MICROMANIPULATOR SUPPORT
Filed Nov. 8, 1966
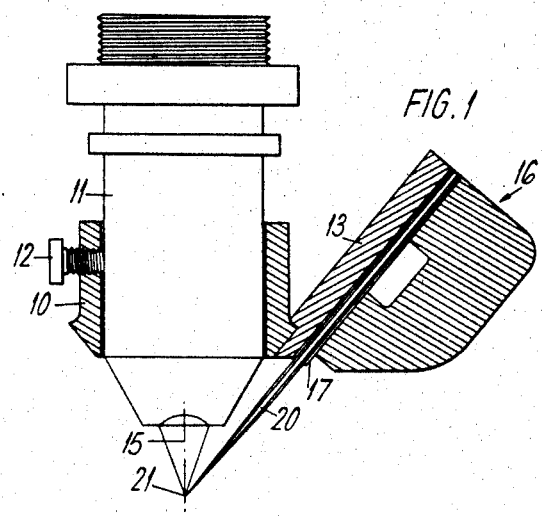
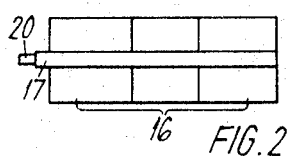
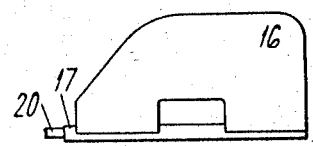
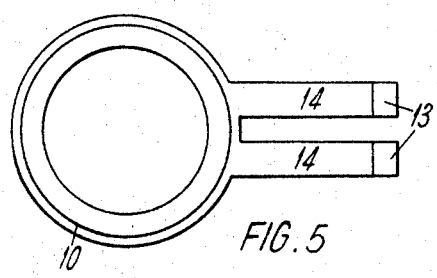
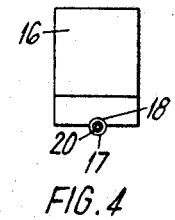

United States Patent Office 3,438,690
Patented Apr. 15, 1969

3,438,690
MICROSCOPE MICROMANIPULATOR SUPPORT
Victor Bruce Darlington Skerman, Brisbane, Queensland, Australia, assignor to The University of Queensland, Brisbane, Queensland, Australia
Filed Nov. 8, 1966, Ser. No. 592,895
Int. Cl. G02b 21/32
U.S. Cl. 350—81          8 Claims

ABSTRACT OF THE DISCLOSURE

A micromanipulator assembly for a miscroscope includes a tool-holder slidable endwise on a slide and supporting a tool passing beneath the microscope objective, and a support for the slide attachable to and carried by said objective. The support may be rotatable around the objective. A micro-tool fabrication system uses a similar arrangement with tool-forming elements (e.g. a heater) carried by the microscope stage.

---

This invention relates to micromanipulators, for very small tools and their mountings used for working on single cells or other microscopic objects. The invention also relates to devices for fabricating such tools under the microscope.

It is one object of the invention to provide a micromanipulator in which manipulation of the tool is particularly simple.

It is another object to provide a tool-holder in which the tool is always in focus in the microscope field. In this aspect, the invention comprises a microscope tool-holder assembly including a support attachable for axial adjustment on a microscope objective, a slide forming part of said support, and a tool-holder slidable along said slide on a straight line passing beneath said objective. The tool-holder may be magnetically attached to the slide and is preferably slidable in a direction to intersect the center of the microscope field.

With a straight tool in the tool-holder, the support may be adjusted on the objective to bring any part of the tool into focus and then the tool may be slid back, the tool remaining in or near focus, until the working point of the tool is correctly placed for the manipulation required.

In another aspect, the invention comprises a device for fabricating a micro-tool including a tool-forming element (such as a controllably heated wire) movable with the mechanical stage of the microscope, and a tool-holder mounted slidably on a support attached to the microscope objective, said support being rotatable around an axis intersecting the axis of the optical system of the microscope.

In order that the invention may be understood, specific embodiments will now be described by way of example, with reference to the accompanying drawing, in which:

FIGURE 1 shows in section a tool-holder assembly mounted on a microscope objective and with a tool in place, FIGURES 2, 3 and 4 show the tool-holder of FIGURE 1 in reverse plan, side elevation and end elevation, FIGURE 5 shows a plan view of the support used in the assembly of FIGURE 1.

Figure 6:
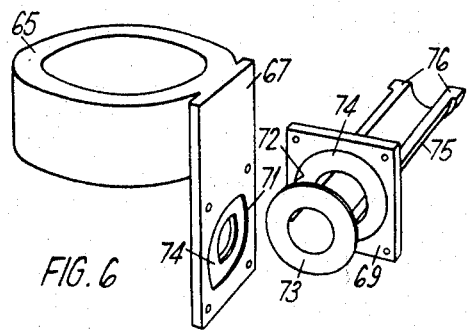
FIGURE 6 shows a dis-assembled perspective view of a second embodiment.

The micromanipulator of FIGURES 1 to 5 will first be described.

A brass collar 10 is mounted with a working fit around the outer casing 11 of the microscope objective and a set-screw 12 of plastic allows the collar 10 to be fixed at a selected position, circumferentially and axially. A pair of steel slides 13 with their undersurfaces 14 machined flat and parallel are fixed to the collar 10, inclining down so that the center line of these faces intersects the optical axis 15 of the microscope.

A permanent C-shaped magnet 16 is provided with a tool-holding tube 17, cemented into a groove 18, longitudinally across its two faces. The tube axis lies on the plane of the magnet faces, and the projecting part of the tube 17 in operation lies in the gap between the steel slides, being positioned and held by grip of the magnet 16 on the slides 13. The tool 20 to be used, which may be of glass or metal, is inserted and fixed in tube 17 by wax or similar means, and projects down to intersect the optical axis 15 when in the operating position.

In use, the collar 10 and slides 13 are secured to the objective 11 in the lowest position. The magnet tool holder 16 and tool 20 are attached to the slides and pushed down until the tool tip has crossed the optical axis 15. The collar 10 is then slowly raised until any part of the tool 20 is in focus at the center of the field. The tube 17 is made to have slight play within the gap between slides 13 so that slight side movements of the tool 20 are possible for centering.

The magnet 16 is then drawn back up the slides 13 until the tool tip is at the focal point 21 (as shown in FIG. 1), when final focus adjustment of the collar 10 may be necessary. The tool 20 is then withdrawn further and the specimen searched and centered as required. The microscope barrel is raised, the tool tip returned to center position, and the specimen re-focussed, thus contacting the specimen with the tip of the tool 20.

In the arrangement described, the tool moves with focussing movement of the objective so that, once adjusted to be in focus, it can be retracted out of the way and returned to the center of the field still in focus. This contrasts with any system in which the tool is mounted on the microscope stage or does not move with the objective. The guided magnetic mounting gives particularly smooth and accurate control of endwise tool movement.

Turning now to the device shown in FIGURES 6, 7 and 8 for fabricating tools for use in the micromanipulator, the principle used is that of fabricating a tool while mounted in the magnetic mount later to be used on the micromanipulator. For this purpose, the tool blank is magnetically mounted and the magnet attached to a slide which is rotatable as a unit about its center axis in a support mounted so that this center axis intersects the optical axis of the microscope. The support is axially slidable and rotatable on the microscope objective, similarly to the support of the micromanipulator.

In detail, the support 60 (FIG. 7) includes a first collar 61 slidable and rotatable on the objective 62 and secured by a set-screw 63. This collar 61 has a lower peripheral lip 64, and a second collar 65 rotates on the first collar 61 in contact with this lip, being held by a set-screw 66. A vertical support-plate 67 extends down from the outside of the second collar 65 and has a hole 68 through it and a cover plate 69, having a co-axial somewhat larger hole 70 in it, is secured to its outer side. Corresponding circular cavities 71, 72 (FIG. 6), are milled in the contacting faces of the support-plate 67, and the cover plate 69 to form a circular recess.

An annular plate 73 having a poly-tetrafluoroethylene ring 74 on each side is mounted in this recess and a steel slide 75 extends from plate 73 through the hole 70 in cover plate 69. The slide 75 is preferably semi-circular in section and is accurately placed at right angles to the annular plate 73 with its upper spaced edges 76 accurately flat and parallel. A magnet tool-holder 77 identical to that of the micromanipulator, having a glass rod tool blank 78 in it, is attached to slide 75, the tool blank 78 being in line with the center of the annular plate 73 and with the optical axis of the microscope.

Figure 7:
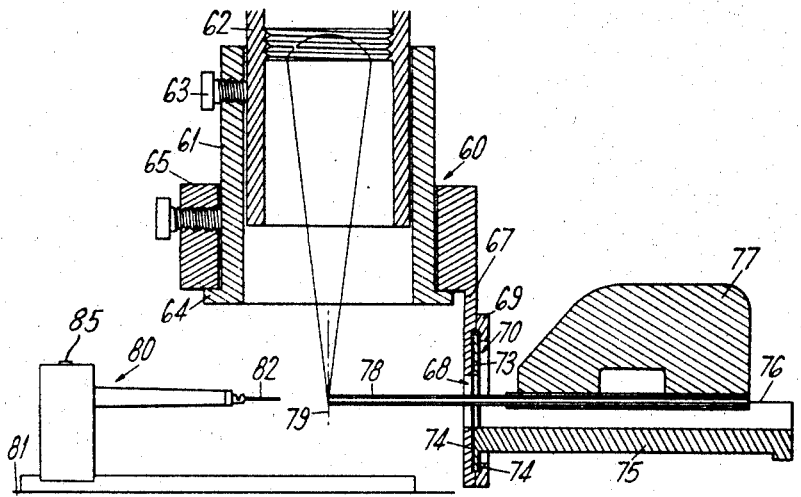
FIGURE 7 shows, partly in section, the arrangement of FIGURE 6 in use for fabricating micro-tools.
Figure 8:
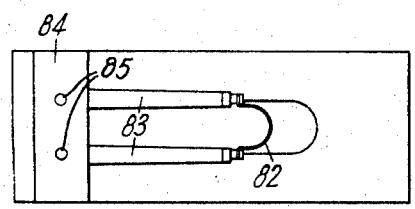
FIGURE 8 shows a plan view of a heating arrangement.

A heating device generally designated 80 in FIG. 7, for forming glass tools is mounted for movement with the mechanical stage of the microscope. The device 80, as shown in FIG. 8, comprises a platinum-iridium wire loop 82 extending on insulators 83 from an insulating block 84 and connected to electrical terminals 85 on the block. To heat the wire controllably, these terminals 85 are connected to a transformer (not shown) via a rheostat heat-control and a limiting resistor to prevent overheating.

In operation, the tool-holder 77 is slid forward on the slide 75 until the tool blank 78 extends across the optical axis 79 and the first collar 61 is adjusted axially on the objective 62 to focus the blank 78 and is secured. The tool-holder 77 is then retracted until the tip of the blank 78 is centered in the field. Focus is retained or very nearly retained for rotation of the slide 75 on the annular plate 73 (i.e. rotation about the axis of the tool blank) and for rotation of the second collar 65 on lip 64 around the first collar 61 (i.e. rotation of the whole apparatus around the optical axis).

The heating wire 82 is then brought across by the mechanical stage 81 and the microscope barrel adjusted to focus it in opposition to the tip of the blank 78. Heating of the wire 82 melts the end of the blank 78, which can then be drawn out by retracting the stage 81 or tool-holder 77. By manipulating the wire 82, a micro-loop (of the order of $5/1000$ inch diameter) may be formed on the tool. The flatness of such a loop may be determined by rotating the slide 75 90° on the annular plate 73 and the plane of loop adjusted. The angle of the loop on its stem may be adjusted by rotating the apparatus 90° on the second collar 65 and pressing the loop near its base with the hot wire 82. Obviously tool-forming elements other then the wire 82 (such as micro-welding electrodes, or mechanical cutters) may be used.

It will be seen that complete control of all necessary operations is available for forming various tools in a very simple manner. The tool once formed, is already mounted in the tool-holder ready for use in the micromanipulator previously described.

The apparatus as a whole is a simple, small in size and adapted for used on any microscope. While manual control of the tool-holder and collars are found to be effective for normal use, micrometer or vernier adjustments may be used for very accurate work.

Various other changes and modifications may be made without departing from the invention, as defined by the appended claims.

The term "micromanipulator" is for convenience used in the present specification and claims, as referring both to a manipulator (such as shown in FIGS. 1–5) for operating on microscopic objects with formed tools, and a manipulator (as in FIGS. 6–8) for forming tools from tool-blanks.

What is claimed is:

1. In combination, a microscope including an objective, and a micromanipulator assembly mounted on said objective, said assembly comprising a support engaged with said objective for being axially displaceable therealong, means for securing said support in selected axial position on the microscope objective such that the support will move axially with said objective; a slide attached to said support to move axially therewith; and a tool-holder magnetically mounted on said slide for slidable movement along said slide in a straight line passing beneath said objective whereby a portion of a tool carried by the holder can be viewed through the objective and focussed by relative axial adjustment of the holder along the objective, and the holder can be moved along the slide such that the tool is positioned in an operative viewing position or a retracted position in which it is out of view.

2. An assembly as claimed in claim 1, wherein said support is rotatable on said objective.

3. An assembly as claimed in claim 2, in which said line passes through the optical axis of the microscope.

4. An assembly as claimed in claim 3, in which said slide is inclined downwardly towards said axis.

5. A micro-tool fabrication assembly for a microscope including: a support including a first collar having a flange around its lower edge; adjustable means for attaching said collar at any preselected axial position on the microscope objective to move axially with said objective; rotation means including a second collar rotatable on said first collar with its lower edge bearing on said flange; a slide attached to said second collar; and a holder for a tool-blank mounted for endwise movement along said slide in a straight line passing beneath said objective, said support including a plate having a circular aperture therein, said slide being concentrically mounted for rotation in said aperture.

6. An assembly as claimed in claim 1, wherein said tool-holder is magnetically attached to said slide.

7. An assembly as claimed in claim 6, in which said tool-holder includes a magnet; a groove in that face of said magnet contacting the slide; a tool-holding tube mounted in said groove and projecting above said face; said slide being bifurcated and having arms lying on either side of the projecting part of said tube in operative position.

8. An assembly as claimed in claim 5, including: a tool-forming element mounted on the microscope stage for movement therewith.

References Cited
UNITED STATES PATENTS

| | | | |
|---|---|---|---|
| 979,333 | 12/1910 | Poe | 350—81 X |
| 2,997,918 | 8/1961 | Spear. | |
| 3,187,736 | 6/1965 | Adamczyk. | |
| 3,321,993 | 5/1967 | Pomerantz | 350—81 X |
| 3,360,876 | 1/1968 | Nestegard. | |

DAVID SCHONBERG, *Primary Examiner.*

PAUL R. GILLIAM, *Assistant Examiner.*